US009443459B2

(12) United States Patent
Liao

(10) Patent No.: US 9,443,459 B2
(45) Date of Patent: Sep. 13, 2016

(54) FLAT DISPLAY PANEL

(71) Applicant: AU OPTRONICS CORP., Hsin-Chu (TW)

(72) Inventor: Wei-Chien Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/503,995

(22) Filed: Oct. 1, 2014

(65) Prior Publication Data

US 2016/0020223 A1 Jan. 21, 2016

(30) Foreign Application Priority Data

Jul. 21, 2014 (TW) ............................. 103124947 A

(51) Int. Cl.
*G06F 3/038* (2013.01)
*G09G 3/20* (2006.01)
*G09G 3/36* (2006.01)

(52) U.S. Cl.
CPC .............. *G09G 3/20* (2013.01); *G09G 3/3648* (2013.01); *G09G 3/3607* (2013.01); *G09G 3/3659* (2013.01); *G09G 2320/0219* (2013.01)

(58) Field of Classification Search
USPC ..................................... 345/204; 257/59, 72
See application file for complete search history.

(56) References Cited

U.S. PATENT DOCUMENTS 8,581,888 B2 11/2013 Lai et al.
2011/0273654 A1* 11/2011 Wang .................... G02F 1/1368 349/143

* cited by examiner

*Primary Examiner* — Timor Karimy
(74) *Attorney, Agent, or Firm* — WPAT, PC; Justin King; Jonathan Chiang

(57) ABSTRACT

A flat display panel includes a plurality of gate lines, a plurality of data lines, a plurality of tracking gate lines and a display area. The display area is disposed with pixel modules therein. Each pixel module includes a first pixel unit and a second pixel unit. The first pixel unit is configured to determine whether to receive a data transmitted on the first predetermined data line according to a voltage level of the first predetermined gate line. The second pixel unit is configured to determine whether to receive a voltage level of the second predetermined gate line according to a voltage level of the first predetermined gate line and determine whether to receive a data from the first pixel unit according to a voltage level received from the second predetermined gate line.

5 Claims, 6 Drawing Sheets

FLAT DISPLAY PANEL

TECHNICAL FIELD

The present disclosure relates to a flat display panel, and more particularly to a flat display panel suitable for a narrow frame design.

BACKGROUND

In order to have a larger viewing area, the technology about reducing the frame width of a flat panel display is getting more and more popular with the rapid development of flat panel display technology. Please refer to FIG. 1, which is a circuit view of a part of a conventional flat panel display adopting the tracking gate line in pixel technology. As shown, by employing the circuit technology as illustrated in FIG. 1, neither the fan out connection circuit nor the shift registers are required to be disposed on two sides of a panel; and consequentially, the panel can reduce frame width on its both sides.

However, as shown in FIG. 1, in order to control the pixel circuits P1, P2 and P3, the respective voltage levels of the gate lines G1, G2 and G3 must be controlled independently. Therefore, the tracking gate line TG1 is introduced, which is electrically coupled to the gate line G1 and configured to control the voltage level of the corresponding gate line G1; the tracking gate line TG2 is introduced, which is electrically coupled to the gate line G2 and configured to control the voltage level of the corresponding gate line G2; and the tracking gate line TG3 is introduced, which is electrically coupled to the gate line G3 and configured to control the voltage level of the corresponding gate line G3. Specifically, to charge the pixel circuits P1, firstly the related three pixel circuits P1, P2 and P3 must be turned on at the same time. Accordingly, the gate lines G1, G2 and G3, configured to control the turn on or turn off of the pixel circuits P1, P2 and P3, must have high voltage levels, respectively, based on that all the switch transistors of the pixel circuits P1, P2 and P3 are implemented with N-type transistors. In the next phase, the gate line G3 is pulled down to have a low voltage level first and the other two gate lines G2 and G3 are maintained to have high voltage levels. This process may cause a feed-through effect between the gate line G3 and the pixel circuit P3 and this feed-through effect is shared by the three pixel circuits P1, P2 and P3. In other words, the data voltage change caused by this feed-through effect on the pixel circuit P1 is about ⅓ of the data voltage change caused by a feed-through effect on one single pixel circuit.

Then, in the next phase, the gate line G3 is maintained to have a low voltage level; the gate line G1 is maintained to have a high voltage level; and the gate line G2 is pulled down to have a low voltage level. This process may cause a feed-through effect between the gate line G2 and the pixel circuit P2 and this feed-through effect is shared by the two pixel circuits P1 and P2. In other words, the data voltage change caused by this feed-through effect on the pixel circuit P1 is about ½ of the data voltage change caused by a feed-through effect on one single pixel circuit. Then, in the last phase, the gate line G1 is also pulled down to have a low voltage level thereby latching the data in the pixel circuit P1. This process may cause a feed-through effect between the gate line G1 and the pixel circuit P1 and this feed-through effect is shared by the pixel circuit P1 only. In other words, the data voltage change caused by this feed-through effect on the pixel circuit P1 is equal to the data voltage change caused by a feed-through effect on one single pixel circuit.

According to the above description, it is to be noted that the pixel circuit P1 totally has three feed-through effects which are serious enough to affect the data stored therein; the pixel circuit P4 totally has two feed-through effects which are serious enough to affect the data stored therein; and the pixel circuit P5 totally has one feed-through effect which are serious enough to affect the data stored therein.

Generally, the pixel circuits P5, P4 and P1 are used to display the primary red, green, and blue color in one pixel, respectively. Thus, in order to correctly display the desired original color, the aforementioned feed-through effect on the data voltage level must be compensated properly. However, it is quite complicate to compensate the voltage level of the stored data due to the three pixel circuits P5, P4 and P1 have different degrees of feed-through effect.

SUMMARY

Therefore, an aspect of the present disclosure is to provide a flat display panel capable of reducing the effect difference caused by the feed-through effect.

The present disclosure provides a flat display panel, which includes a plurality of gate lines, a plurality of data lines, a plurality of tracking gate lines and a display area. The plurality of gate lines are arranged to be parallel to a first direction. The plurality of data lines are arranged to be parallel to a second direction. The plurality of tracking gate lines are arranged to be parallel to the second direction. Each one of the plurality of tracking gate lines is electrically coupled to one of the plurality of gate lines. The display area is disposed with a plurality of pixel modules therein. Each one of the plurality of pixel modules includes a first pixel unit and a second pixel unit. The first pixel unit is electrically coupled to a first predetermined data line of the plurality of data lines and a first predetermined gate line of the plurality of gate lines. The first pixel unit is configured to determine whether to receive a data transmitted on the first predetermined data line according to a voltage level of the first predetermined gate line. The second pixel unit is electrically coupled to the first predetermined gate line, a second predetermined gate line of the plurality of gate lines and the first predetermined data line through the first pixel unit. The second predetermined gate line is different with the first predetermined gate line. The second pixel unit is configured to determine whether to receive a voltage level of the second predetermined gate line according to a voltage level of the first predetermined gate line and determine whether to receive a data from the first pixel unit according to a voltage level received from the second predetermined gate line.

In summary, through changing the arrangement of the pixel circuits, the data voltage change caused by the feed-through effect can be greatly reduced in the present disclosure. In addition, an improved compensation effect is also achieved by some simple compensation ways, such as the adjustment of the common voltage level, when a compensation for the feed-though effect is required.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
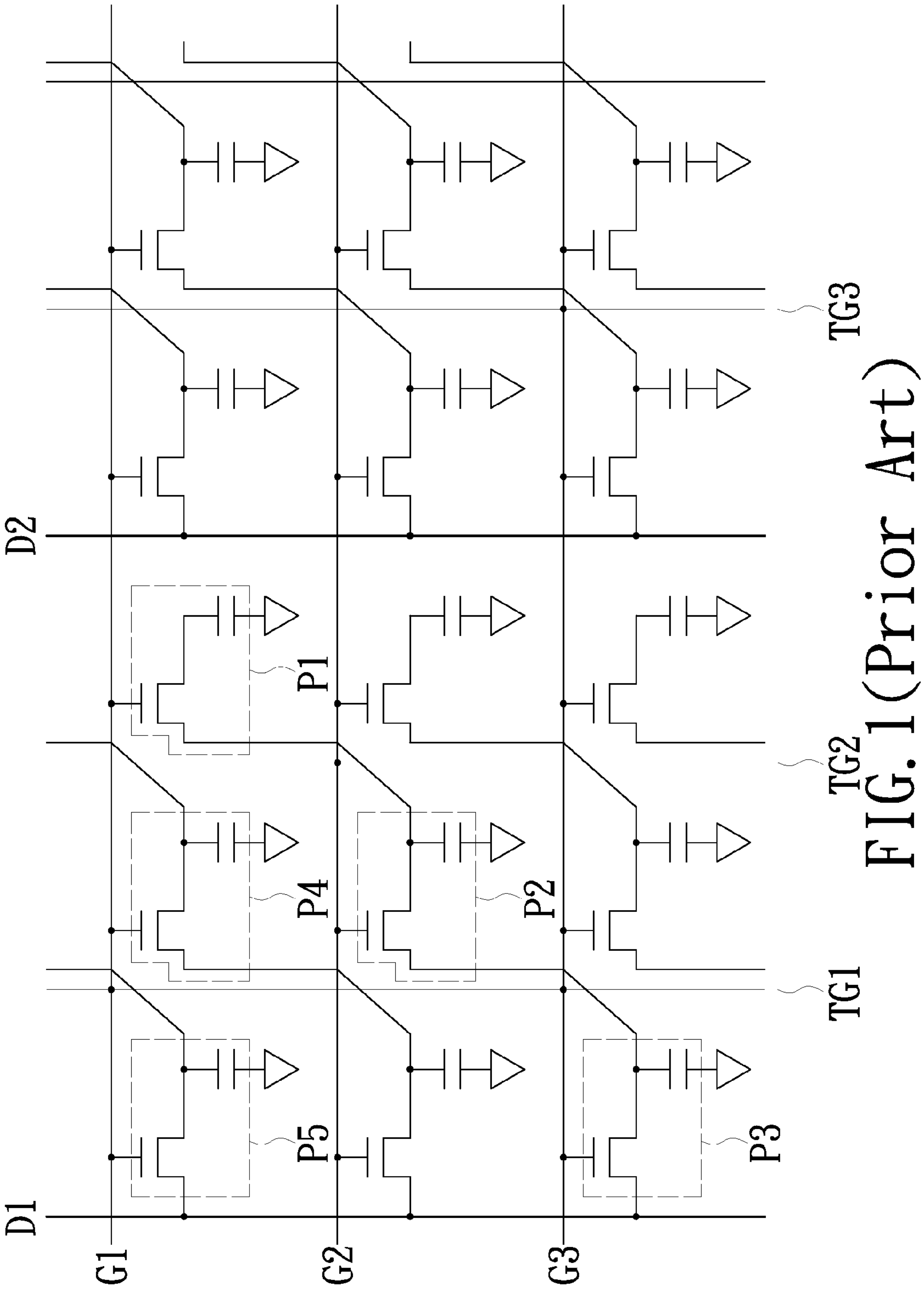
FIG.1(Prior Art)
FIG. 1 is a circuit view of a part of a conventional flat panel display adopting the tracking gate line in pixel technology.
Figure 2:
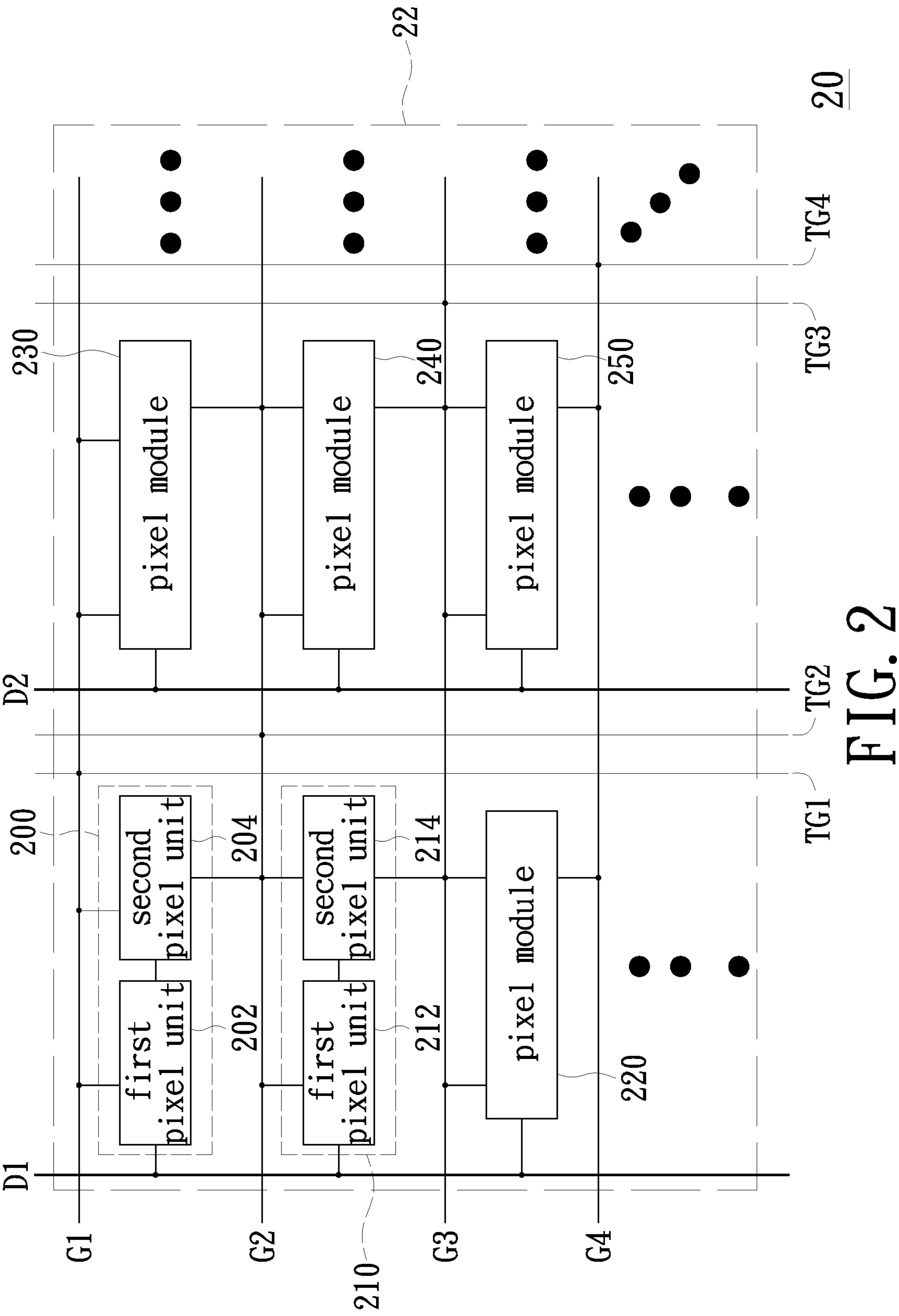
FIG. 2 is a circuit block view of a flat panel display in accordance with an embodiment of the present disclosure.

FIG. 2 is a circuit block view of a flat panel display in accordance with an embodiment of the present disclosure. As shown, the flat panel display 20 in the present embodiment includes data lines D1, D2, gate lines G1, G2, G3, G4, tracking gate lines TG1, TG2, TG3, TG4 and a display area 22. Specifically, the gate lines G1~G4 are arranged to extend in a direction along the X-axis; and the data lines D1, D2 and the tracking gate lines TG1~TG4 are arranged to extend in a direction along the Y-axis. Furthermore, the tracking gate lines TG1, TG2, TG3 and TG4 are electrically coupled to the gate lines G1, G2, G3 and G4 thereby being configured to control the voltage levels of the signals transmitted on the gate lines G1, G2, G3 and G4, respectively. In addition, to facilitate a convenience for the control of the displaying results, the data lines D1, D2, the gate lines G1, G2, G3, G4 and the tracking gate lines TG1, TG2, TG3, TG4 are arranged to cross the display area 22 in the present embodiment so as to provide the respective control signals and the respective display data appropriately. The "cross" herein refers to that these data lines D1, D2, gate lines G1, G2, G3, G4 and tracking gate lines TG1, TG2, TG3, TG4 are arranged to extend from the first external side of the display area 22 to the second side of the display area 22 through the internal of the display area 22; however, it is to be noted that these data lines D1, D2, gate lines G1, G2, G3, G4 and tracking gate lines TG1, TG2, TG3, TG4 are not necessary to reach to the edge of the second side or even cross out the second side of the display area 22.

Besides the data lines D1, D2, the gate lines G1, G2, G3, G4 and the tracking gate lines TG1, TG2, TG3, TG4, the display area 22 mainly includes pixel modules 200, 210, 220, 230, 240 and 250. Each one of the pixel modules 200~250 includes a first pixel unit and a second pixel unit. For example, the pixel module 200 includes a first pixel unit 202 and a second pixel unit 204; and the pixel module 210 includes a first pixel unit 212 and a second pixel unit 214. Because the pixel modules 200, 210, 220, 230, 240 and 250 have similar external or internal circuit-coupling relationships, only one of the pixel circuits (for example, the pixel module 200) is taken as an example for the following illustration.

As shown in FIG. 2, the first pixel unit 202 is electrically coupled to the gate line G1 and the data line D1. Specifically, the first pixel unit 202 is configured to determine whether to receive the data transmitted on the data line D1 or not according to the voltage level on the gate line G1. The second pixel unit 204 is electrically coupled to the gate lines G1, G2, the first pixel unit 202, and the data line D1 through the first pixel unit 202. Specifically, the second pixel unit 204 is configured to determine whether to receive the voltage level transmitted on the gate line G2 or not according to the voltage level on the gate line G1. In addition, the second pixel unit 204 is configured to determine whether to receive the data from the first pixel unit 202 or not according to the voltage level received from the gate line G2. In addition, through an appropriate timing design, the data received by the second pixel unit 204 from the first pixel unit 202 is the data being transmitted on the data line D1; and accordingly, the data stored in the first pixel unit 202 is also the data being transmitted on the data line D1.

The detailed circuit diagrams will be provided as follow. However, it is understood that these circuit diagrams are provided for exemplary purposes only, and the present disclosure is not limited thereto. In addition, the following embodiments are exemplarily implemented with N-type transistors. However, these N-type transistors in each embodiment are functioned as switches; thus, to those ordinarily skilled in the art it is understood that these N-type transistors can be replaced by other types of switch elements and the present disclosure is not limited thereto. Similarly, the following embodiments are exemplified by using capacitors as the elements for storing charges. However, to those ordinarily skilled in the art, it is understood that these capacitors can be replaced by other types of charge storage elements and the present disclosure is not limited thereto.

Figure 3:
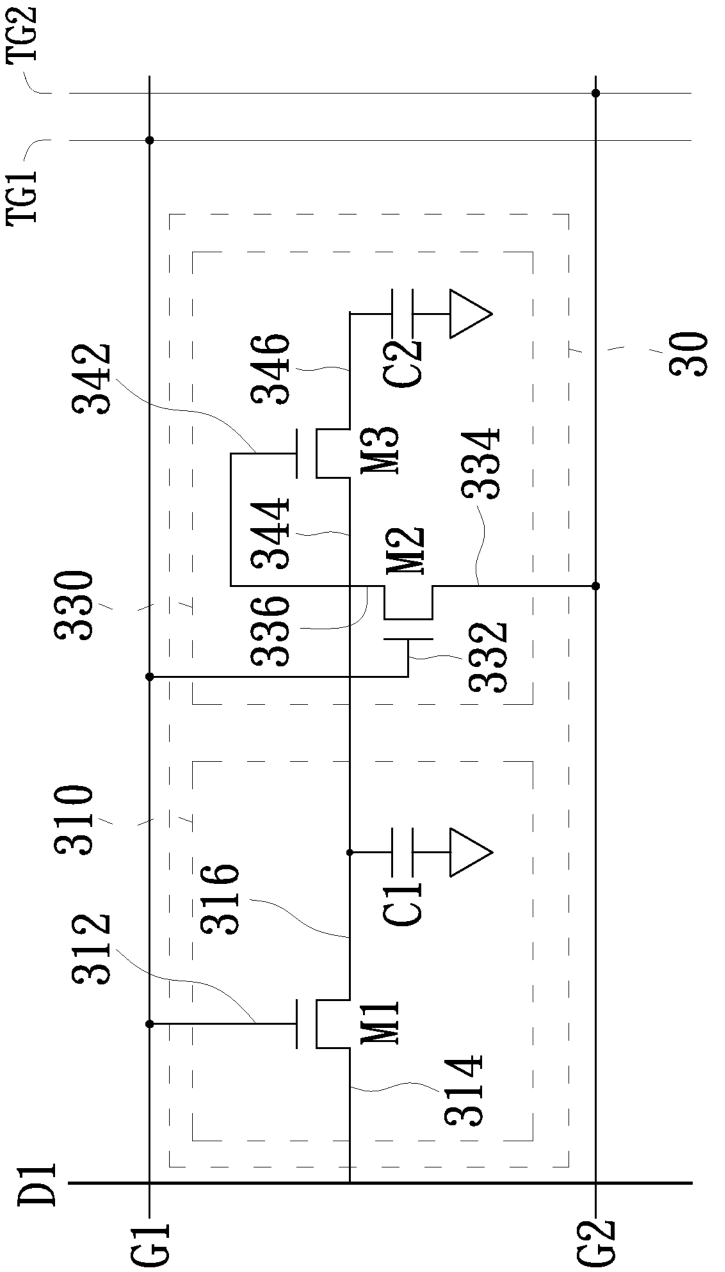
FIG. 3 is a circuit view of a pixel module in accordance with an embodiment of the present disclosure.

Referring to FIG. 3, which is a circuit view of a pixel module in accordance with an embodiment of the present disclosure. As shown, the pixel module 30 in the present embodiment includes a first pixel unit 310 and a second pixel unit 330. The pixel module 30 is electrically coupled to the gate lines G1, G2 and the data line D1. In addition, the tracing guide line TG1 is electrically coupled to the gate line G1 and is configured to control the voltage level of the signal transmitted on the gate line G1. Similarly, the tracing guide line TG2 is electrically coupled to the gate line G2 and is configured to control the voltage level of the signal transmitted on the gate line G2.

As shown in FIG. 3, the first pixel unit 310 includes an N-type transistor M1 and a capacitor C1. The N-type transistor M1 is configured to have its control terminal 312 electrically coupled to the gate line G1; its channel terminal 314 electrically coupled to the data line D1; and its channel terminal 316 electrically coupled to a first terminal of the capacitor C1. The capacitor C1 is configured to have its second terminal for receiving a predetermined voltage level. In one embodiment, the predetermined voltage level received by the capacitor C1 is the common voltage of the related flat panel display. In the first pixel unit 310, the N-type transistor M1 is configured to determine whether to turn on an electric channel between the channel terminals 314 and 316 or not according to the voltage level of the control terminal 312, thereby delivering the data transmitted on the data line D1 to the channel terminal 316 through the channel terminal 314 and then storing the data into the capacitor C1 when the electric channel is turned on.

In addition, as shown in FIG. 3, the second pixel unit 330 includes N-type transistors M2, M3 and a capacitor C2. The N-type transistor M2 is configured to have its control terminal 332 electrically coupled to the gate line G1; its channel terminal 334 electrically coupled to the gate line G2; and its channel terminal 336 electrically coupled to a control terminal 342 of the N-type transistor M3. The N-type transistor M3 is configured to have its control terminal 342 electrically coupled to the channel terminal 336 of the N-type transistor M2; its channel terminal 344 electrically coupled to the channel terminal 316 of the N-type transistor M1; and its channel terminal 346 electrically coupled to a first terminal of the capacitor C2. The capacitor C2 is configured to have its second terminal for receiving the predetermined voltage level. In the second pixel unit 330, the N-type transistor M2 is configured to determine whether to turn on an electric channel between the channel terminals 334 and 336 or not according to the voltage level of the control terminal 332, thereby transmitting the voltage level on the gate line G2 to the control terminal 342 of the N-type transistor M3 when the electric channel is turned on. The N-type transistor M3 is configured to determine whether to turn on an electric channel between the channel terminals 344 and 346 or not according to the voltage level of the control terminal 342, thereby transmitting the voltage level of the channel terminal 316 of the N-type transistor M1 to the channel terminal 346 through the channel terminal 344 of the N-type transistor M3 and then storing the voltage level into the capacitor C2 when the electric channel is turned on.

The above-described embodiment is used for an exemplary purpose only. In fact, the technical purpose, preventing one specific pixel unit from being affected by the feed-through effects of other pixel units as well as preventing other pixel units from being affected by the feed-through effect of one specific pixel unit, can be realized by using one gate line (for example, the aforementioned gate line G1) to control whether to let the voltage levels of other gate lines enter into a specific pixel unit.

Figure 4:
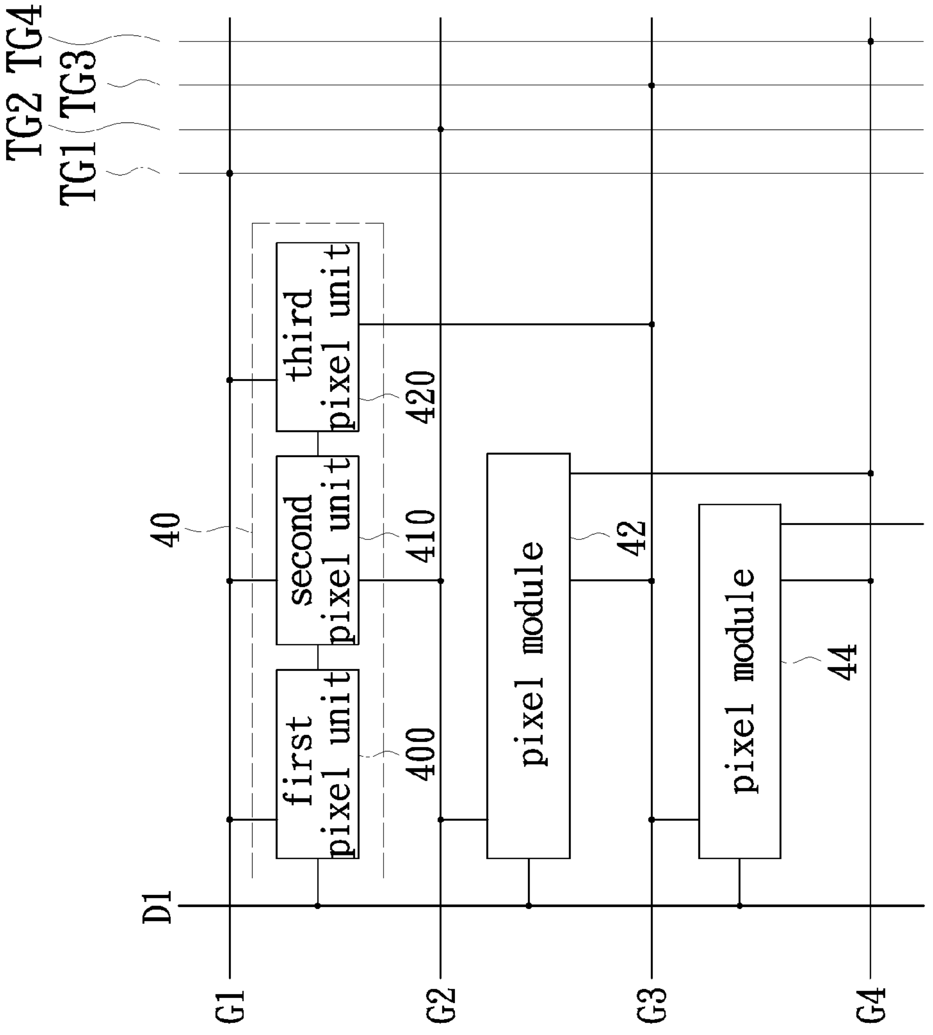
FIG. 4 is a circuit block view of a flat panel display in accordance with another embodiment of the present disclosure.

Please refer to FIG. 4, which is a circuit block view of a flat panel display in accordance with another embodiment of the present disclosure. As shown, the gate lines G1, G2, G3 and G4 are electrically coupled to the tracking gate lines TG1, TG2, TG3 and TG4, respectively. The pixel module 40 is electrically coupled to the gate lines G1, G2, G3 and the data line D1. The pixel module 42 is electrically coupled to the gate lines G2, G3, G4 and the data line D1. The pixel module 44 is electrically coupled to the gate lines G3, G4, G5 (not shown) and the data line D1. The display module 40 includes a first pixel unit 400, a second pixel unit 410 and a third pixel unit 420. The circuit-coupling relationships and the operational functions of the first pixel unit 400 and the second pixel unit 410 have been described in FIG. 2, and no redundant detail is to be given herein. The third pixel unit 420 is electrically coupled to the gate lines G1, G3, the second pixel unit 410, and the data line D1 through the second pixel unit 410 and the first pixel unit 400. Thus, the third pixel unit 420 is configured to determine whether to receive the voltage level transmitted on the gate line G3 or not according to the voltage level on the gate line G1 and determine whether to receive the data transmitted from the second pixel unit 410 or not according to the received voltage level on the gate line G3.

Figure 5:
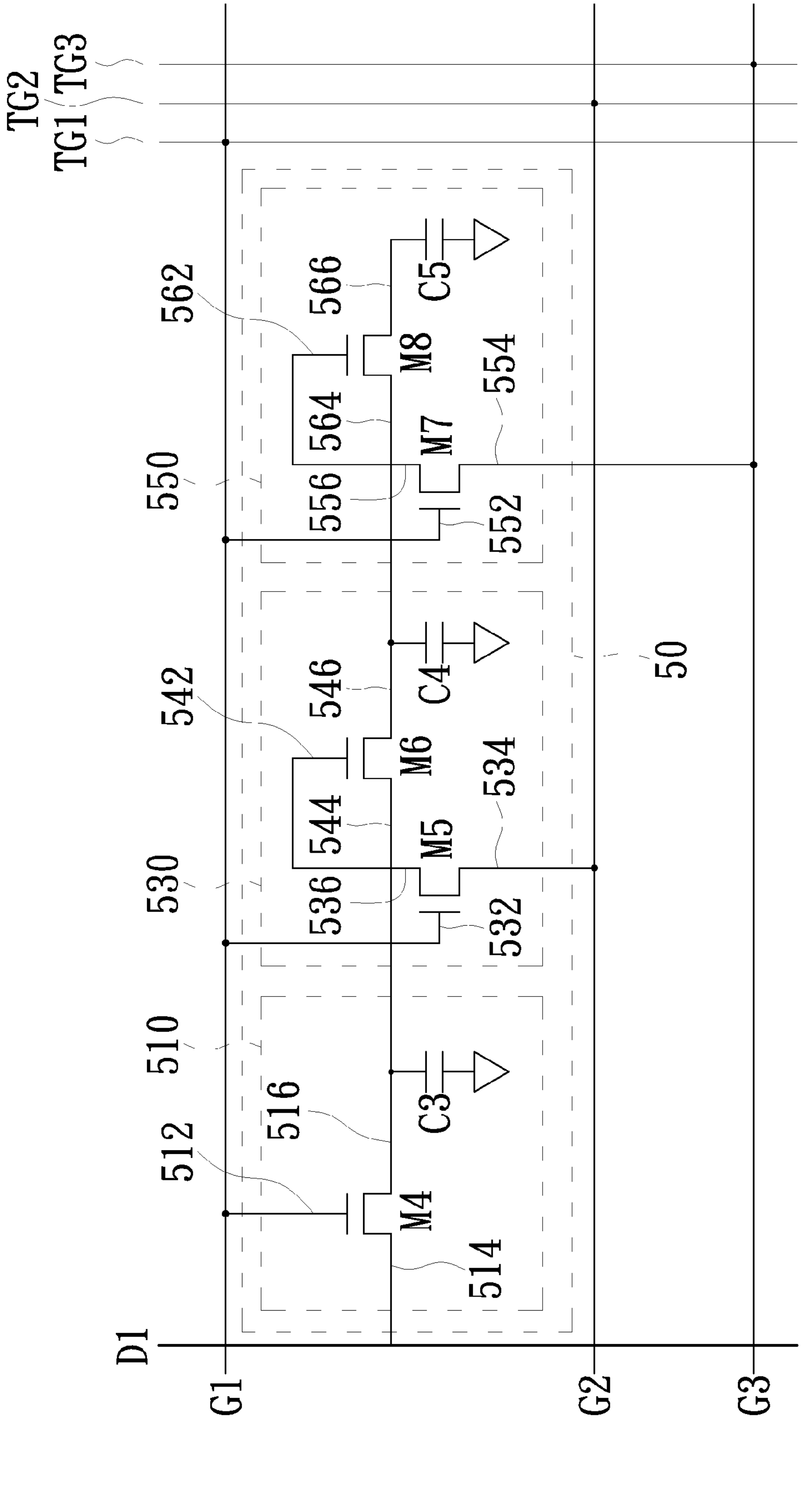
FIG. 5 is a circuit view of a pixel module in accordance with another embodiment of the present disclosure.

Referring to FIG. 5, which is a circuit view of a pixel module in accordance with another embodiment of the present disclosure. As shown, the pixel module 50 in the present embodiment includes a first pixel unit 510, a second pixel unit 530 and a third pixel unit 550. The he first pixel unit 510 includes an N-type transistor M4 and a capacitor C3. The N-type transistor M4 is configured to have its control terminal 512 electrically coupled to the gate line G1; its channel terminal 514 electrically coupled to the data line D1; and its channel terminal 516 electrically coupled to a first terminal of the capacitor C3. The capacitor C3 is configured to have its second terminal for receiving a predetermined voltage level. In the first pixel unit 510, the N-type transistor M4 is configured to determine whether to turn on an electric channel between the channel terminals 514 and 516 or not according to the voltage level of the control terminal 512, thereby delivering the data transmitted on the data line D1 to the channel terminal 516 through the channel terminal 514 and then storing the data into the capacitor C3 when the electric channel is turned on.

In addition, as shown in FIG. 5, the second pixel unit 530 includes N-type transistors M5, M6 and a capacitor C4. The N-type transistor M5 is configured to have its control terminal 532 electrically coupled to the gate line G1; its channel terminal 534 electrically coupled to the gate line G2; and its channel terminal 536 electrically coupled to a control terminal 542 of the N-type transistor M6. The N-type transistor M6 is configured to have its control terminal 542 electrically coupled to the channel terminal 536 of the N-type transistor M5; its channel terminal 544 electrically coupled to the channel terminal 516 of the N-type transistor M4; and its channel terminal 546 electrically coupled to a first terminal of the capacitor C4. The capacitor C4 is configured to have its second terminal for receiving the predetermined voltage level. In the second pixel unit 530, the N-type transistor M5 is configured to determine whether to turn on an electric channel between the channel terminals 534 and 536 or not according to the voltage level of the control terminal 532, thereby transmitting the voltage level on the gate line G2 to the control terminal 542 of the N-type transistor M6 when the electric channel is turned on. The N-type transistor M6 is configured to determine whether to turn on an electric channel between the channel terminals 544 and 546 or not according to the voltage level of the control terminal 542, thereby transmitting the voltage level of the channel terminal 516 of the N-type transistor M4 to the channel terminal 546 through the channel terminal 544 of the N-type transistor M6 and then storing the voltage level into the capacitor C4 when the electric channel is turned on.

In addition, as shown in FIG. 5, the third pixel unit 550 includes N-type transistors M7, M8 and a capacitor C5. The N-type transistor M7 is configured to have its control terminal 552 electrically coupled to the gate line G1; its channel terminal 554 electrically coupled to the gate line G3; and its channel terminal 556 electrically coupled to a control terminal 562 of the N-type transistor M8. The N-type transistor M8 is configured to have its control terminal 562 electrically coupled to the channel terminal 556 of the N-type transistor M7; its channel terminal 564 electrically coupled to the channel terminal 546 of the N-type transistor M6; and its channel terminal 566 electrically coupled to a first terminal of the capacitor C5. The capacitor C5 is configured to have its second terminal for receiving the predetermined voltage level. In the third pixel unit 550, the N-type transistor M7 is configured to determine whether to turn on an electric channel between the channel terminals 554 and 556 or not according to the voltage level of the control terminal 552, thereby transmitting the voltage level on the gate line G3 to the control terminal 562 of the N-type transistor M8 when the electric channel is turned on. The N-type transistor M8 is configured to determine whether to turn on an electric channel between the channel terminals 564 and 566 or not according to the voltage level of the control terminal 562, thereby transmitting the voltage level of the channel terminal 546 of the N-type transistor M6 to the channel terminal 566 through the channel terminal 564 of the N-type transistor M8 and then storing the voltage level into the capacitor C5 when the electric channel is turned on.

The pixel module including three pixel units as illustrated in FIGS. 4 and 5 are specifically suitable for the RGB flat panel display. However, it is understood that the pixel module may include more than three pixel units in response to other circuit design concerns. The additional pixel unit may have a circuit design same as that of the aforementioned second pixel unit or the third pixel unit. In other words, one specific gate line (for example, the gate line G1) is configured to provide a main control signal, which is for determining whether to allow the voltage levels on other gate lines (for example, the gate lines G2 and G3) to enter into the respective pixel unit or not; and the other gate lines are configured to determine whether to receive the voltage level on the data line. Thus, the desired technical object of the present disclosure is achieved.

Figure 6:
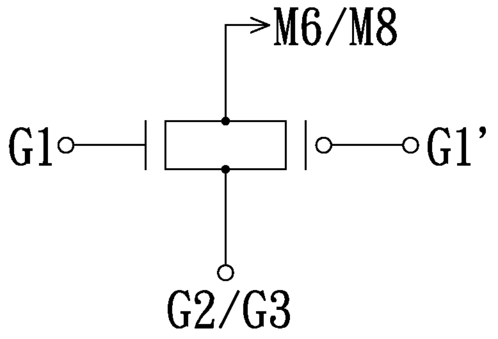
FIG. 6 is circuit view of a switch element in accordance with an embodiment of the present disclosure.

In addition, the second pixel unit 530 is functioned as a switch for determining whether to receive the voltage level on the gate line G2 or not; in other words, the N-type transistor M5 can be implemented with other types of switch element. Please refer to FIGS. 5 and 6. FIG. 6 is circuit view of a switch element in accordance with an embodiment of the present disclosure; wherein this switch element is took as an example for replacing the N-type transistor M5. As shown, the switch element in the present embodiment includes a transmission gate, which is implemented with an N-type transistor and a P-type transistor. Specifically, the N-type transistor part of the transmission gate is configured to have its control terminal electrically coupled to the gate line G1; the P-type transistor part of the transmission gate is configured to have its control terminal electrically coupled to the gate line G1' (hereafter is also called a complementary gate line); the transmission gate is configured to have its first channel terminal electrically coupled to the gate line G2 and its second channel terminal electrically coupled to the control terminal 542 of the N-type transistor M6. Specifically, it is to be noted that the voltage level on the gate line G1 and the voltage level on the gate line G1' are complementary with each other; in other words, the gate line G1 has a high voltage level while the gate line G1' has a low voltage level and the gate line G1' has a high voltage level while the gate line G1 has a low voltage level.

It is understood that the switch element of FIG. 6 may be used for replacing the N-type transistor M7. Specifically, the N-type transistor part of the transmission gate of FIG. 6 is configured to have its control terminal electrically coupled to the gate line G1; the P-type transistor part of the transmission gate is configured to have its control terminal electrically coupled to the gate line G1' (hereafter is also called a complementary gate line); the transmission gate is configured to have its first channel terminal electrically coupled to the gate line G3 and its second channel terminal electrically coupled to the control terminal 562 to the N-type transistor M8.

The detailed operation of the pixel module 50 of FIG. 5 will be described as follow with a reference of FIG. 7, which is a timing chart of the related signals of the pixel module of FIG. 5. Initially, at the time point $t_1$, the gate lines G1, G2 and G3 are converted to have high voltage levels. Thus, the N-type transistors M4, M5, M6, M7 and M8 are turned on. Then, during the period between the time points $t_1$ and $t_2$, the data on the data line D1 is transmitted to the channel terminal 516 through the turned-on N-type transistor M4 and then stored in the capacitor C3; the data is further transmitted to the channel terminal 546 through the turned-on N-type transistor M6 and then stored in the capacitor C4; and the data is further transmitted to the channel terminal 566 through the turned-on N-type transistor M8 and then stored in the capacitor C5.

Then, at the time point $t_2$, the gate lines G1, G2 are maintained to have high voltage levels but the gate line G3 is converted to have a low voltage level. Thus, the N-type transistors M4, M5, M6 and M7 are turned on but the N-type transistor M8 is turned off. Because both of the N-type transistors M4 and M6 are turned on, the feed-through effect occurring at the time point $t_2$ is shared by the three pixel circuits 510, 530 and 550. Accordingly, the data stored in the capacitor C5 will be affected by this feed-through effect and the data voltage change caused by this feed-through effect on the capacitor C5 is about ⅓ of the data voltage change caused by a feed-through effect on one single pixel circuit. In theory, the data stored in the capacitors C3 and C4 may be also affected by this feed-through effect at the time point $t_2$; however, because meanwhile the capacitors C3 and C4 are still receiving the data from the data line D1, actually this feed-through effect has no any effect on the data eventually stored in the capacitors C3 and C4.

Then, at the time point $t_3$, the gate line G2 is also converted to have a low voltage level. Thus, the N-type transistors M4, M5 and M7 are maintained to be turned on but the N-type transistor M6 is turned off. Because the N-type transistor M4 is still turned on, the feed-through effect occurring at the time point $t_3$ is shared by the two pixel circuits 510 and 530. Accordingly, the data stored in the capacitor C4 will be affected by this feed-through effect and the data voltage change caused by this feed-through effect on the capacitor C4 is about ½ of the data voltage change caused by a feed-through effect on one single pixel circuit. In theory, the data stored in the capacitor C3 may be also affected by this feed-through effect at the time point $t_3$; however, because meanwhile the capacitor C3 is still receiving the data from the data line D1, actually this feed-through effect has no any effect on the data eventually stored in the capacitor C3.

Then, at the time point $t_4$, the gate line G1 is also converted to have a low voltage level. Thus, the N-type transistors M4, M5 and M7 are turned off and the feed-through effect occurring at the time point $t_4$ is shared by the pixel circuit 510 only. Accordingly, the data stored in the capacitor C3 will be affected by this feed-through effect and the data voltage change caused by this feed-through effect on the capacitor C3 is equal to the data voltage change caused by a feed-through effect on one single pixel circuit.

Therefore, according to the above operation, the ratio of the data voltage changes caused by the feed-through effect on the pixel circuits 510, 530 and 550 is about 6:3:2 (derived from 1:0.5:0.3). Thus, compared with the ratio 2:5:11 (derived from ⅓:(⅓+½):(⅓+½+1)) in prior art, the data voltage change caused by the feed-through effect is greatly reduced in the present disclosure. In addition, because the data voltage change caused by the feed-through effect is reduced in the present disclosure, the compensation of the feed-through effect is simpler. For example, the compensation of the feed-through effect can be realized through adjusting the common voltage level in the present disclosure and still has improved effect, compared with the prior art adopting the same compensation way.

Figure 7:
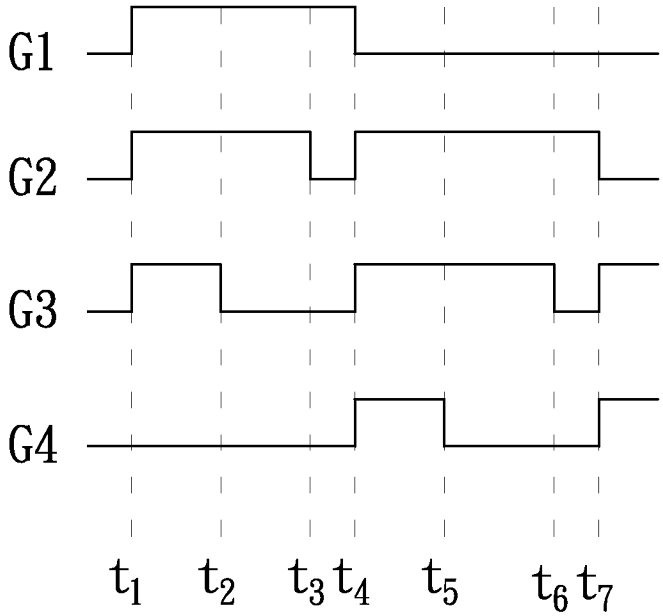
FIG. 7 is a timing chart of the related signals of the pixel module of FIG. 5.

As illustrated in FIG. 7, in response to the length of charging path or other related factors, it is to be noted that the ratio of the time lengths between $t_3$~$t_4$ to $t_2$~$t_3$ is about 1:2 and the ratio of the time lengths between $t_3$~$t_4$ to $t_1$~$t_2$ is about 1:3; however, the present disclosure is not limited thereto. In another embodiment, both of ratios of the time lengths between $t_3$~$t_4$ to $t_2$~$t_3$ and the time lengths between $t_3$~$t_4$ to $t_1$~$t_2$ is about 1:3 may be configured to about 1:1 or other proper value.

The operation performed between the time points $t_3$~$t_4$ is a complete charging for the pixel module 40 in FIG. 4; and the complete charging for the pixel module 42 is controlled by the waveforms of the gate lines G2, G3 and G4 between the time points $t_4$~$t_7$. As illustrated in FIG. 7, the waveforms of the gate lines G2, G3 and G4 between the time points $t_4$~$t_7$ are same as the waveforms of the gate lines G1, G2 and G3 between the time points $t_1$~$t_4$; thus, the driving of the other pixel modules can be obtained based on the same manner, and no redundant detail is to be given herein.

In summary, through changing the arrangement of the pixel circuits, the data voltage change caused by the feed-through effect can be greatly reduced in the present disclosure. In addition, an improved compensation effect is also achieved by some simple compensation ways, such as the adjustment of the common voltage level, when a compensation for the feed-though effect is required.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flat display panel, comprising:

a plurality of gate lines, arranged to be parallel to a first direction;

a plurality of data lines, arranged to be parallel to a second direction;

a plurality of tracking gate lines, arranged to be parallel to the second direction, each one of the plurality of tracking gate lines being electrically coupled to one of the plurality of gate lines; and a display area, disposed with a plurality of pixel modules therein, each one of the plurality of pixel modules comprising:

a first pixel unit, comprising:

a first switch element, comprising a control terminal, a first channel terminal and a second channel terminal, the first switch element being configured to have its control terminal electrically coupled to a first predetermined gate line of the gate lines and to have its first channel terminal electrically coupled to a first predetermined data line of the data lines, the first switch element being further configured to determine whether to turn on an electrical channel between its first channel terminal and its second channel terminal or not according to a voltage level of its control terminal; and a first storage element, comprising a first terminal and a second terminal, the first storage element being configured to have its first terminal electrically coupled to the second channel terminal of the first switch element and its second terminal for receiving a predetermined voltage level; and a second pixel unit, comprising:

a second switch element, comprising a control terminal, a first channel terminal and a second channel terminal, the second switch element being configured to have its control terminal electrically coupled to the first predetermined gate line and to have its first channel terminal electrically coupled to a second predetermined gate line of the gate lines, the second switch element being further configured to determine whether to turn on an electrical channel between its first channel terminal and its second channel terminal or not according to a voltage level of its control terminal;

a third switch element, comprising a control terminal, a first channel terminal and a second channel terminal, the third switch element being configured to have its control terminal electrically coupled to the second channel terminal of the second switch element and its first channel terminal electrically coupled to the second channel terminal of the first switch element, the third switch element being further configured to determine whether to turn on an electrical channel between its first channel terminal and its second channel terminal or not according to a voltage level of its control terminal; and a second storage element, comprising a first terminal and a second terminal, the second storage element being configured to have its first terminal electrically coupled to the second channel terminal of the third switch element and its second terminal for receiving the predetermined voltage level.

2. The flat display panel according to claim 1, wherein each one of the plurality of pixel modules further comprises:

a third pixel unit, electrically coupled to the first predetermined gate line, a third gate line of the plurality of gate lines and the first predetermined data line through the second pixel unit and the first pixel unit, the third gate line being different with the first predetermined gate line and second predetermined gate line, the third pixel unit being further configured to determine whether to receive a voltage level of the third gate line or not according to a voltage level of the first predetermined gate line and determine whether to receive a data transmitted from the second pixel unit or not according to the received voltage level of the third gate line.

3. The flat display panel according to claim 2, wherein the third pixel unit comprises:

a first switch element, comprising a control terminal, a first channel terminal and a second channel terminal, the first switch element being configured to have its control terminal electrically coupled to the first predetermined gate line and its first channel terminal electrically coupled to the third gate line, the first switch element being further configured to determine whether to turn on an electrical channel between its first channel terminal and its second channel terminal or not according to a voltage level of its control terminal;

a second switch element, comprising a control terminal, a first channel terminal and a second channel terminal, the second switch element being configured to have its control terminal electrically coupled to the second channel terminal of the first switch element and its first channel terminal electrically coupled to the second pixel unit, the second switch element being further configured to determine whether to turn on an electrical channel between its first channel terminal and its second channel terminal or not according to a voltage level of its control terminal and thereby determining whether to transmit a data, received by its first channel terminal and derived from the second pixel unit, to its second channel terminal or not; and a storage element, comprising a first terminal and a second terminal, the storage element being configured to have its first terminal electrically coupled to the second channel terminal of the second switch element and its second terminal for receiving a predetermined voltage level.

4. The flat display panel according to claim 2, wherein the third pixel unit is further electrically coupled to a first complementary gate line, correspondingly the third pixel unit is further configured to determine whether to receive a voltage level of the third gate line or not according to a voltage level of the first predetermined gate line and a voltage level of the first complementary gate line, wherein a signal transmitting on the first predetermined gate line and a signal transmitting on the first complementary gate line are complementary with each other.

5. The flat display panel according to claim 4, wherein the third pixel unit comprises:

a transmission gate, comprising a first control terminal, a second control terminal, a first channel terminal and a second channel terminal, the transmission gate being configured to have its first control terminal electrically coupled to the first predetermined gate line, its second control terminal electrically coupled to the first complementary gate line, and its first channel terminal electrically coupled to the third gate line;

a switch element, comprising a control terminal, a first channel terminal and a second channel terminal, the switch element being configured to have its control terminal electrically coupled to the second channel terminal of the transmission gate and its first channel terminal electrically coupled to the second pixel unit, the switch element being further configured to determine whether to turn on an electrical channel between its first channel terminal and its second channel terminal or not according to a voltage level of its control terminal and thereby determining whether to transmit a data, received by its first channel terminal and derived from the second pixel unit, to its second channel terminal or not; and a storage element, comprising a first terminal and a second terminal, the storage element being configured to have its first terminal electrically coupled to the second channel terminal of the switch element and its second terminal for receiving a predetermined voltage level.

* * * * *